United States Patent [19]
Kamide et al.

[11] Patent Number: 4,635,272
[45] Date of Patent: Jan. 6, 1987

[54] LASER DISCHARGE TUBE

[75] Inventors: Noboru Kamide, Tokyo; Hiroshi Hijikata, Urawa; Katsumi Tokudome, Saitama; Michio Ishikawa, Kawagoe; Yuji Hayashi, Tokyo, all of Japan

[73] Assignee: Kimmon Electric Co., Ltd., Tokyo, Japan

[21] Appl. No.: 836,222

[22] Filed: Feb. 28, 1986

Related U.S. Application Data

[63] Continuation of Ser. No. 437,124, Oct. 28, 1982.

[30] Foreign Application Priority Data

Nov. 4, 1981 [JP] Japan ................................. 56-176850
Nov. 4, 1981 [JP] Japan ................................. 56-176851
Nov. 4, 1981 [JP] Japan ................................. 56-176852

[51] Int. Cl.$^4$ ............................................. H01S 3/097
[52] U.S. Cl. ........................................ 372/87; 372/61; 372/56; 372/37; 372/85
[58] Field of Search .................... 372/86–88, 372/37, 85, 76, 61, 56, 55

[56] References Cited

U.S. PATENT DOCUMENTS

| | | | |
|---|---|---|---|
| 3,688,217 | 8/1972 | Witte et al. | 372/59 |
| 3,882,417 | 5/1975 | Wood et al. | 372/87 |
| 3,967,214 | 6/1976 | Thatcher | 372/85 |
| 4,343,040 | 8/1982 | Shibayama et al. | 372/87 |
| 4,380,078 | 4/1983 | Wang et al. | 372/87 |

OTHER PUBLICATIONS

Grace et al, "Design and Performance of an Improved Hollow Cathode He-Cd+ Laser, *J. Phys. D: Appl. Phys.*, vol. 12 (1979), p. 2043.
"He-Cd Laser of Long Life and Low Noise", The Review of Laser Engineering, vol. 8, No. 2, Mar. 1980, pp. 407–414.
T. T. Wang and H. Schonhorn, pp. 5138-5144.
Study of noise in He-Cd laser, pp. 287–289.
"The Self-Heated 442-nm He-Cd Laser: Optimizing the Power Output, and the Origin of Beam Noise," pp. 482–493.
He-Cd Lasers Using Recirculation Geometry, pp. 740–743.
Correspondence, pp. 425–426, IEEE Journal of Quantum Electronics, vol. QE-7, No. 8, Aug. 1971.

*Primary Examiner*—Leon Scott, Jr.
*Attorney, Agent, or Firm*—Frishauf, Holtz, Goodman & Woodward

[57] ABSTRACT

A laser discharge tube comprises a discharge envelope and an anode and cathode both disposed within the envelope. The envelope includes a capillary tube having a hole. In this hole the tip portion of the anode is inserted. Outside the envelope there is provided a magnet generating a magnetic field which lies in the vicinity of the anode.

21 Claims, 16 Drawing Figures

LASER DISCHARGE TUBE

This application is a continuation of application Ser. No. 437,124, filed Oct. 28, 1982.

BACKGROUND OF THE INVENTION

This invention relates to a laser, and more particularly to a low-noise metal vapor laser.

A gas laser is known which emits a laser beam by energizing a laser medium with discharge generated between an anode and a cathode. The laser beam contains noise and is not practically useful. Particularly, a laser beam emitted from a He-Cd laser contains much noise. use of the He-Cd laser is therefore limited. Thus, it is desired that a gas laser whose output laser beam contains little noise be provided.

Some methods of generating a laser beam containing less noise are known. One of them is disclosed in "Laser Kenkyu", Vol. 8, No. 2, 1980, pp. 407–414, in which the pressure of helium gas is maintained low. This method is disadvantageous because the laser beam generated is only a low-power beam.

SUMMARY OF THE INVENTION

It is an object of the present invention to provide a laser which can emit a laser beam of a sufficiently large power but containing little noise.

According to the invention there is provided a laser discharge tube comprising an envelope, a laser medium contained in the envelope, an anode and a cathode both disposed in the envelope for causing a discharge between them to thereby energize the laser medium, and means for concentrating the discharge on the tip of the anode.

DETAILED DESCRIPTION OF THE PREFERRED EMBODIMENTS

Figure 1:
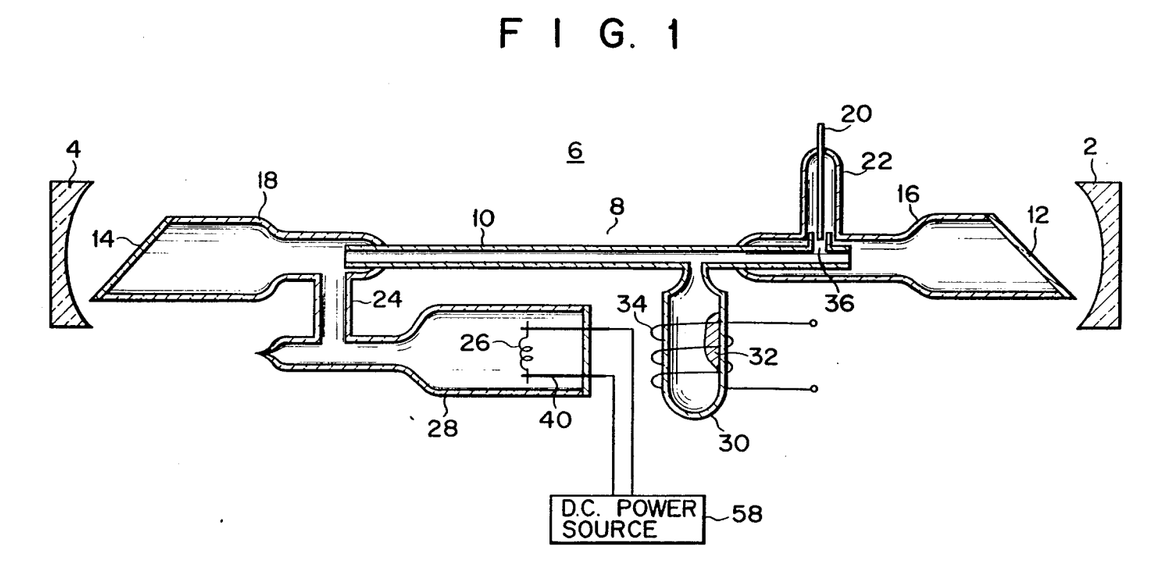
FIG. 1 is a sectional view schematically illustrating a laser discharge tube according to the invention.

With reference to FIG. 1 a He-Cd laser according to the invention will be described. A pair of reflective mirrors 2 and 4 are arranged to form an optical cavity on a common optical axis. Between the mirrors 2 and 4 a He-Cd discharge tube 6 filled with He gas under a predetermined pressure is disposed coaxial with the mirrors 2 and 4. The envelope 8 of the tube 6 is comprised of a capillary tube 10, a tube 16 coupled in airtight fashion to one end of the capillary tube 10 and a tube 18 coupled in airtight fashion on the other end of the capillary tube 10. In the capillary tube 10 discharge will take place in the mixture of He gas and Cd vapor. A Brewster window 12 is attached to the open end of the tube 16, and another Brewster window 14 is attached to the open end of the tube 18. A first branch tube 22 is connected to the tube 16, and a second branch tube 24 is connected to the tube 18. An anode 20 is held partly within the first branch tube 22 and partly outside thereof. A tube 28 is coupled in airtight fashion to the second branch tube 24. In the tube 28 a hot cathode 26 is disposed and is connected through cathode terminals 40 to a DC power source 58. To the capillary tube 10 a metal receptacle 30 is coupled which contains a Cd mass 32. A heater filament 34 is wound about the metal receptacle 30 for heating the receptacle 30 to thereby evaporate the Cd mass 32.

Figure 2:
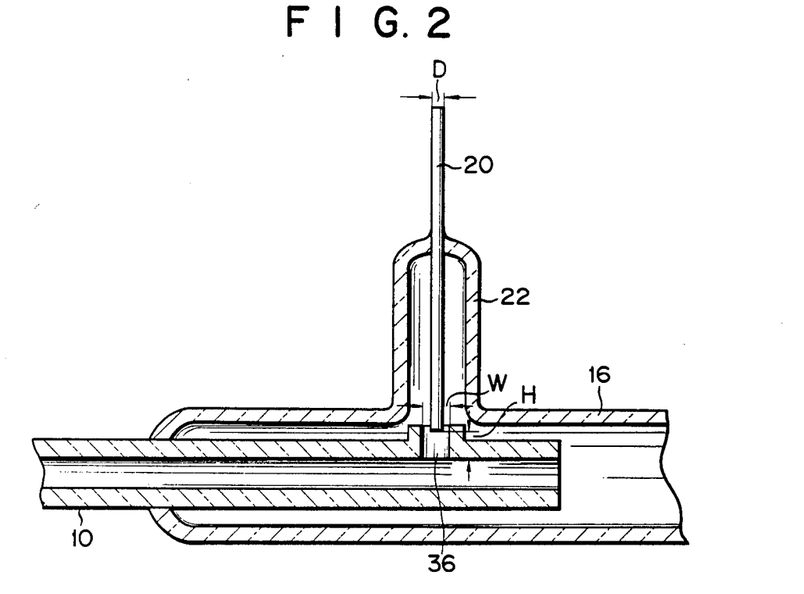
FIG. 2 is an enlarged sectional view of a part of the tube shown in FIG. 1.

As shown in FIG. 2, a narrow discharge passage is provided in the vicinity of the tip of the anode 20. Discharge will thus be concentrated at the tip of the anode 20 and will therefore be stabilized. More specifically, the end portion of the capillary tube 10 which is inserted in the tube 16 has a thick wall portion having a hole 36. The hole 36 opens to the branch tube 22 and receives the tip of the anode 20. The diameter W of the hole 36 is equal to, or less than $[(D+3)\times 2]$ mm, where D is the diameter of the anode 20. A gap of about 3 mm is provided between the periphery of the anode 20 and the hole 36. The distance H between the tip of the anode 20 and the inner surface of the capillary tube 10 is about 1 mm to about 10 mm along the axis of the anode 20.

Discharge generated between the anode 20 and the cathode 26 concentrates on the tip of the anode 20 and thus remains stable. It has not been theoretically ascertained why the discharge remains stable. It is assumed that this is because the discharge passage provided near the anode 20 is narrow, as mentioned above. Two phenomena usually take place in the vicinity of the anode 20: an anodic vibration of discharge, and a random motion of a discharge spot of a low luminance. Since the discharge passage is narrow, the discharge spot stays at the tip of the anode 20. For the same reason, the anodic vibration is suppressed. The discharge therefore remains stable.

Figure 3A:
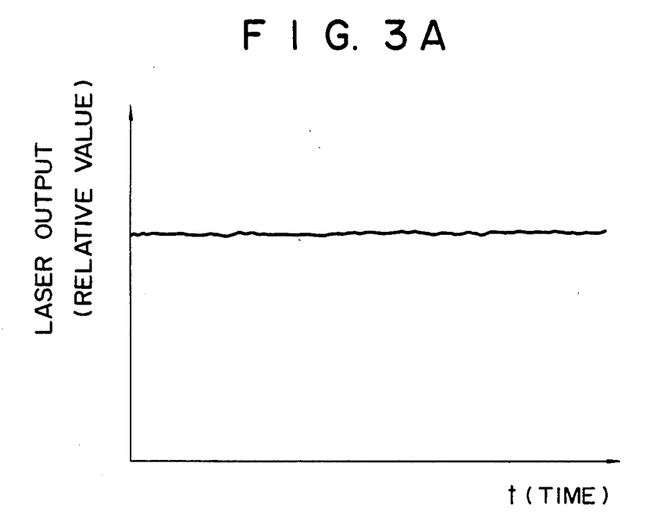
FIGS. 3A and 3B are diagrams respectively showing how the output of the laser discharge tube according to the invention changes with time and how the output of a known laser discharge tube changes with time.
Figure 3B:
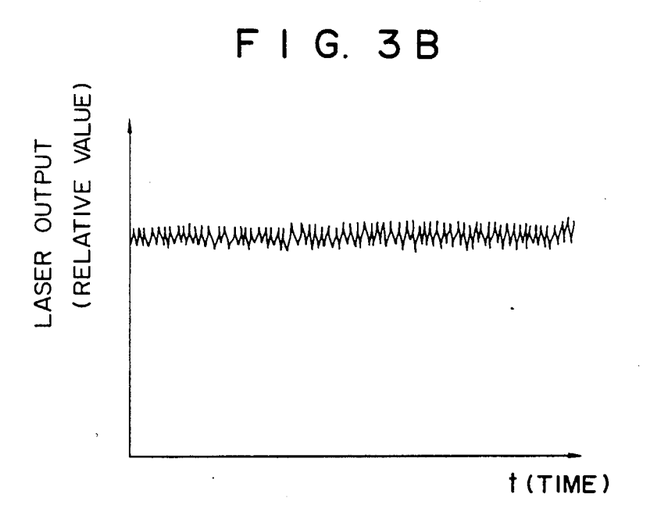

Since the discharge is stable, the noise level of a laser beam emitted by discharge occurring in the He-Cd gas mixture is low as illustrated in FIG. 3A. FIG. 3 shows how the noise level of a laser beam emitted from a known He-Cd laser changes with time. The laser beam generated by the known laser contains so much noise that the peak-to-peak noise amounts to 17%. In contrast, the peak-to-peak noise contained in a laser beam generated by the laser shown in FIGS. 1 and 2 was recorded to be only 2% to 8%.

As described above, the hot cathode 26 is connected through cathode terminals 40 to the DC power source 58, instead of an AC power source which is used in conventional laser discharge tubes. The DC power source 58 applies a DC voltage on the hot cathode 26, to thereby heat the cathode 26 and maintain it at a proper temperature, e.g. 1,200° K. Maintained at such a temperature, the cathode 26 emits electrons. A high-voltage power source (not shown) is provided for applying a high voltage between the anode 20 and the cathode 26 to thereby generate discharge therebetween.

Since a DC voltage, not an AC voltage, is applied on the cathode 26, the surface temperature of the cathode 26 remains constant. It does not undergo even an instantaneous variation. The number of electrons the cathode 26 emits per unit time remains constant because it depends on the surface temperature of the cathode 26 and because the surface temperature remains unchanged. The resultant discharge is therefore stable.

In the case of a metal vapor laser, an unstable discharge results in a laser beam of a high noise level. Since the laser discharge tube of FIG. 1 achieves a stable discharge, its output laser beam has a low noise level.

Figure 4:
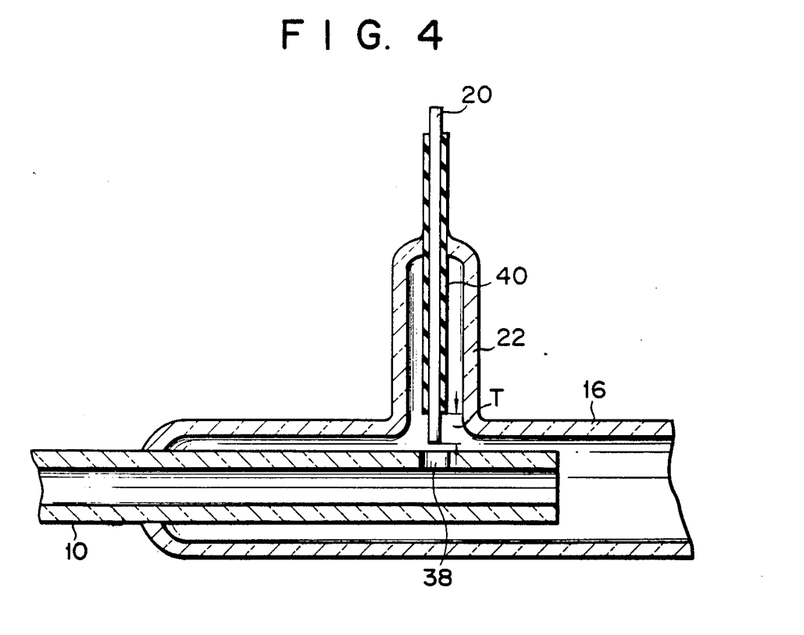
FIG. 4 is an enlarged sectional view of a part of another laser discharge tube according to the invention.

FIG. 4 shows the structure defining the discharge passage of another laser discharge tube according to the present invention. In this embodiment a capillary tube 10 has no thick wall portion and has a hole 38 which opens to a branch tube 22. An anode 20 is covered by an insulating layer 40, except for the tip end portion which is about 10 mm, or less in length. The anode 20 is exposed for distance T.

The laser discharge tube of FIG. 4 was tested and probed to achieve as stable a discharge as the laser discharge tube shown in FIGS. 1 and 2. It successfully generated a laser beam with a low noise level.

Figure 5:
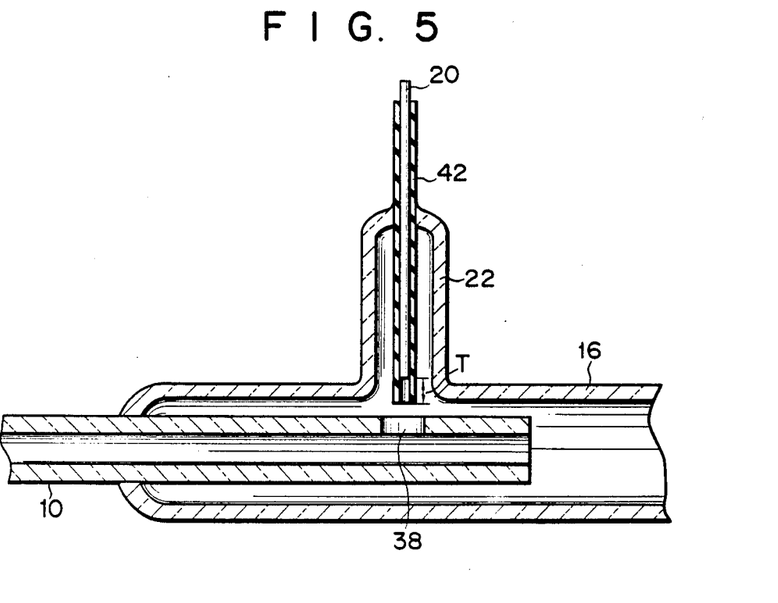
FIG. 5 is an enlarged sectional view of a part of still another laser discharge tube according to the invention.

The same results are obtained if the anode 20 shown in FIG. 4 is replaced by an anode 20 shown in FIG. 5. As shown in FIG. 5, the anode 20 including its tip portion is inserted in an insulation sheath 42. The lower end of the sheath 42 lies low by distance T than the tip of the anode 20, said distance T being about 10 mm or less. The anode 20 is thus not exposed in a branch tube 22. Only its lower end is exposed in the sheath 42. Also in the laser discharge tube of FIG. 5 a narrow discharge passage is provided in the vicinity of the tip of the anode 20 and a stable discharge is accomplished.

Figure 6A:
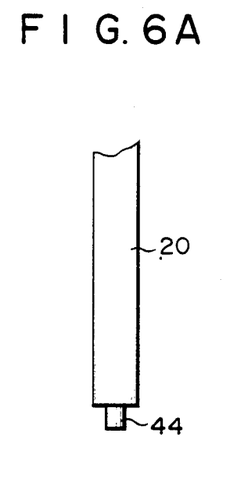
FIGS. 6A to 6C show a few anodes which may be used in the laser discharge tube according to the invention.
Figure 6B:
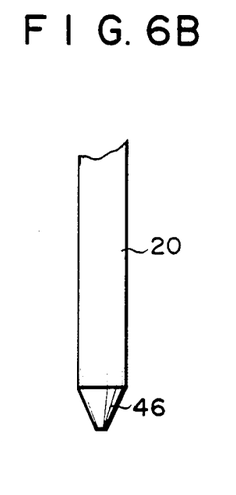
Figure 6C:
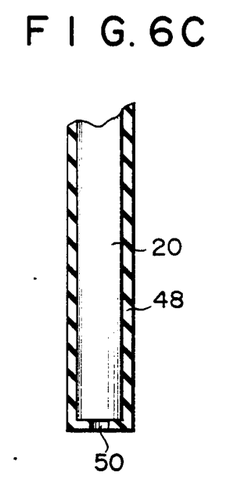

FIGS. 6A, 6B and 6C show other anodes 20 which are so shaped as to stabilize discharge and to help generate a laser beam of a low noise level. The anode 20 shown in FIG. 6A has a projection 44 protruding from the tip. The anode 20 shown in FIG. 6B has a pointed tip 46. The anode 20 shown in FIG. 6C has its periphery and lower end face covered by an insulating layer 48. That portion of the layer 48 which covers the lower end face of the anode 20 has a hole 50. Through this hole 50 the central portion of the lower end face of the anode 20 is exposed. Any of these anodes, if incorporated in the laser discharge tube 6, will limit the motion of a discharge spot, thereby stabilizing the discharge.

Figure 7:
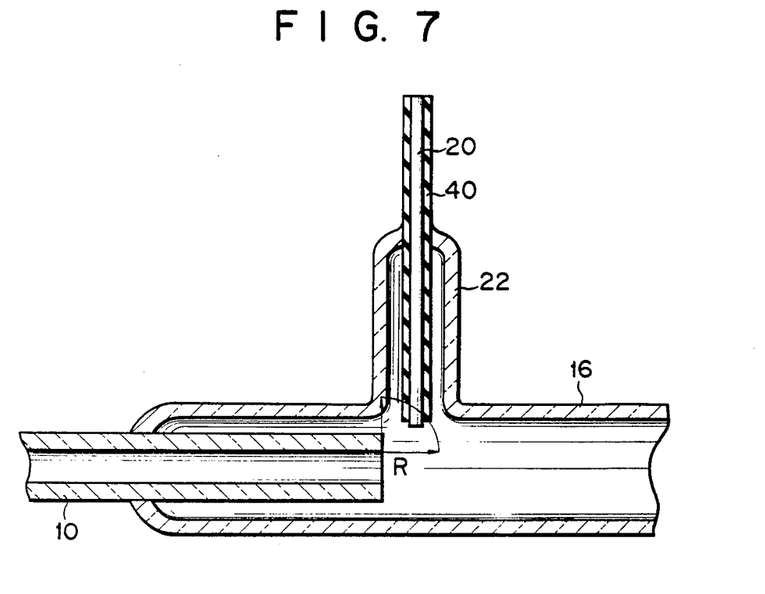
FIG. 7 is an enlarged sectional view of a part of another laser discharge tube according to the invention.

FIG. 7 shows the structure defining the discharge passage of still another laser discharge tube according to the invention. This embodiment is designed based on the results of experiments conducted by the inventors of the present invention. The expriments showed that discharge would remain stable if the tip of an anode 20 is provided with a insulative layer 40 at a specific distance or a shorter distance from the open end of a capillary tube 10. More specifically, it was ascertained that discharge would be stable if the tip of the anode 20 lay within a radius R from the closest point on the inside surface of the tube 10 to the tip of the anode 20. Radius R is 5 mm or less. In this embodiment the open end of the capillary tube 10 is located close to a branch tube 22. No peripheral portion of the tube 10 faces the interior of the branch tube 22 unlike in the other embodiments described above.

In the laser discharge tube of FIG. 7 the discharge flow is concentrated on a specific portion of the anode 20. It is assumed this helps to stabilize the discharge.

Figure 8:
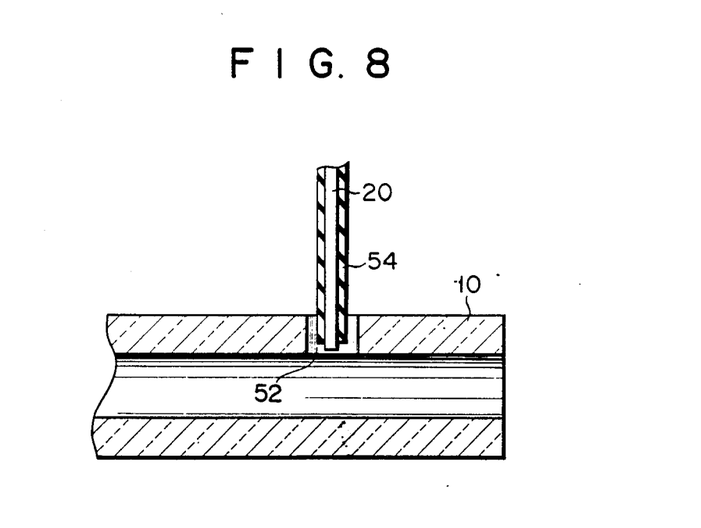
FIG. 8 is an enlarged sectional view of a part of a further laser discharge tube according to the present invention.
Figure 9:
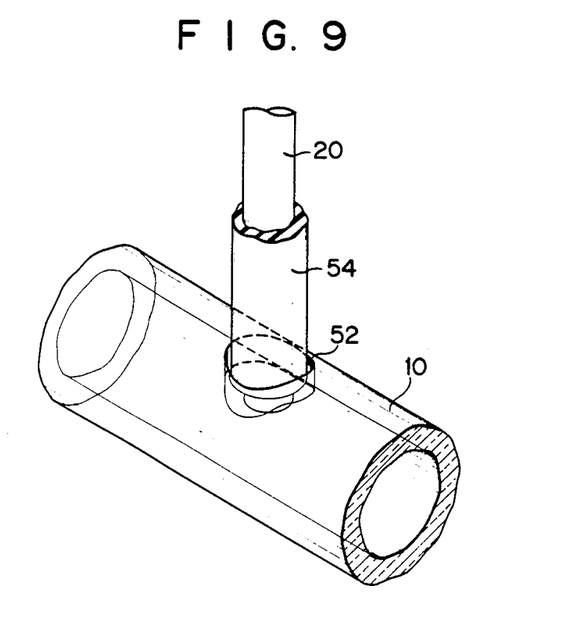
FIG. 9 is an enlarged perspective view of the part of the laser discharge tube shown in FIG. 8.

The same results achieved by the laser discharge tube of FIG. 2 can be obtained by another laser discharge tube shown in FIGS. 8 and 9. In this laser discharge tube, a capillary tube 10 has no thick wall portion. The tube 10 has a hole 52. The lower end portion of an anode 20 is inserted in the hole 52. Except for its tip portion, the anode 20 is covered by an insulating layer 54. The capillary tube has an outer diameter of 7 to 8 mm and an inner diameter of 1.6 mm. The anode 20 has a diameter of 4 mm to 3 mm, preferably about 3 mm. A gap of 1 mm or less is provided between the hole 54 and the periphery of the anode 20. The exposed tip portion of the anode 20 is about 1 mm long and extends into the hole 52.

Figure 10:
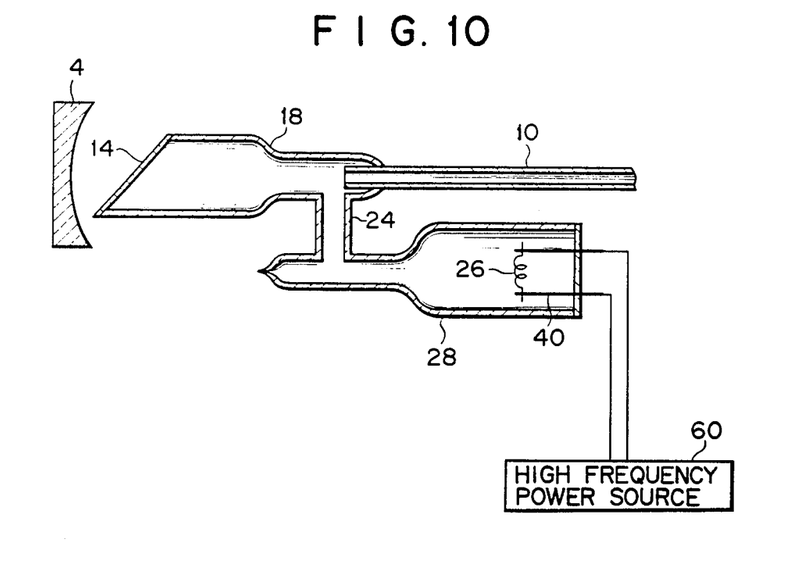
FIGS. 10, 11 and 12 are sectional views each schematically showing a modification of the present invention.

FIG. 10 schematically shows another laser discharge tube according to the present invention. In this laser discharge tube a high-frequency power source 60 is connected to a cathode 26 for applying a voltage of 400 Hz or more to the cathode 26. When the high-frequency voltage is applied to the cathode 26, the cathode 26 is heated and then remains at substantially the same temperature. This helps to stabilize the discharge as in the laser discharge tube of FIG. 1, wherein a DC power source 58 is connected to the hot cathode 26.

Figure 11:
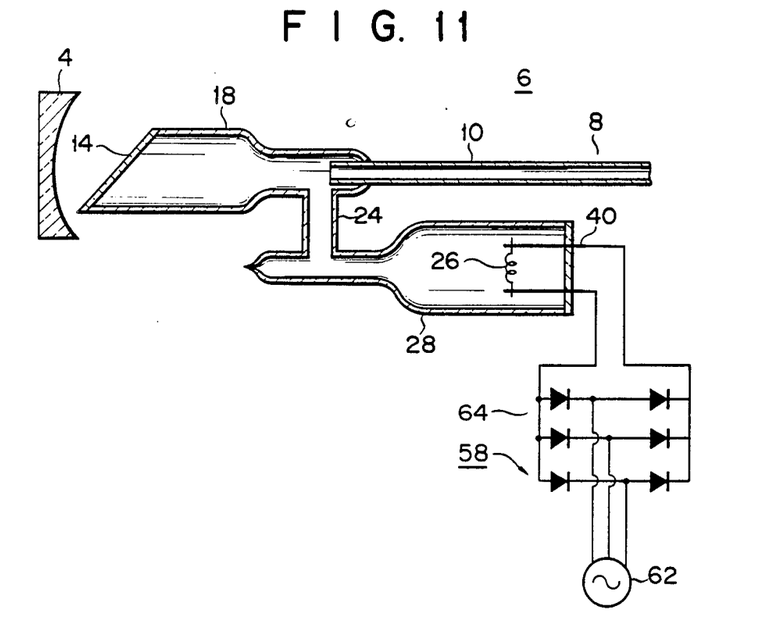

FIG. 11 schematically shows still another embodiment of the invention. In this embodiment, a three-phase AC power source 62 is connected to a hot cathode 26 through a full-wave rectifying circuit 64 and cathode terminals 40. Hence, a DC voltage is supplied from the full-wave rectifying circuit 64 to the cathode 26, thereby activating the same results as in the embodiments described above.

Figure 12:
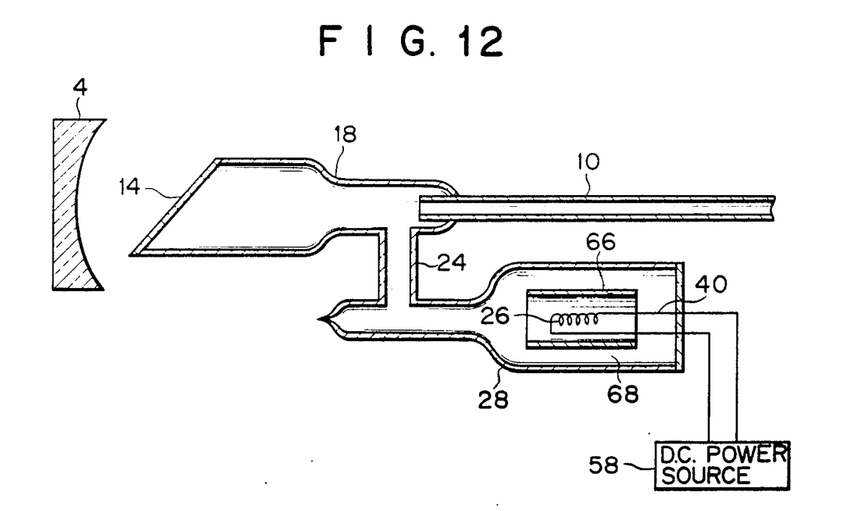

FIG. 12 schematically shows a further embodiment of the present invention. In this embodiment, a hot cathode 26 is disposed within a hollow metal cylinder 66 which is held in a metal tube 28. The cathode 26 and the cylinder 66 constitute an indirectly heated cathode assembly 68. The surface temperature of the cathode assembly 68, i.e. the surface temperature of the cylinder 66, is more stable than that of the cathode 26. The laser discharge tube can therefore accomplish a more stable discharge than the embodiment of FIG. 1. The DC power source 58 may be replaced by an AC power source. Indeed, the surface temperature of the cathode 26 may change if the cathode 26 is heated with an AC voltage. The surface temperature of the cylinder 66 changes little, nonetheless.

Figure 13:
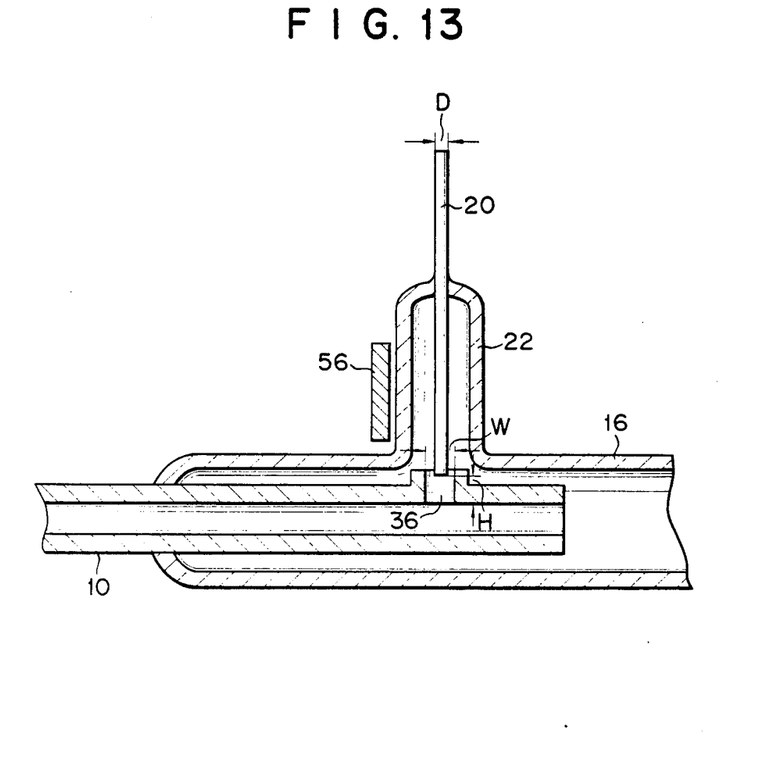
FIG. 13 is an enlarged sectional view of still another laser discharge tube according to the invention.

FIG. 13 schematically illustrates another embodiment of the invention. This embodiment differs from the embodiment of FIG. 1 in that a permanent magnet 56 is provided near a branch tube 22 and that the tip of an anode 20 lies in the magnetic field of the magnet 56. The magnetic field serves to concentrate the discharge generated between the cathode 26 and the anode 20 at the tip of the anode 20. The discharge therefore remains stable. The permanent magnet 56 may be replaced by an electromagnet.

The cathode 26 used in any embodiment described above may be a sintered cathode. A sintered cathode can have a more stable surface temperature and can thus held stabilize the discharge and lower the noise level of a laser beam. If a sintered cathode is used, it may be connected to an AC power source. In this case, the same results will be attained as in the embodiment of FIG. 12.

All the embodiments described thus far are outer mirror type laser and metal vapor lasers having a hot cathode. Nonetheless, the present invention may be applied to an inner mirror type laser and a gas laser having a cold cathode as well.

As mentioned above, according to the present invention, discharge can be stabilized in the laser discharge tube. The laser discharge tube can therefore emit a laser beam of a low noise level.

What we claim is:

1. A metal vapor positive column discharge laser tube comprising:
   an envelope including a capillary tube and a sidearm forming a part of said envelope;
   an active lasing medium contained in the envelope;
   an anode disposed in said sidearm and spaced from a cathode disposed in the envelope;
   means for causing a discharge along a discharge path in said capillary tube between said anode and cathode to thereby energize the laser medium;
   said anode having a tip extending from said sidearm to be in close proximity to said capillary tube;
   said capillary tube having means defining an opening therein adjacent to the extended tip of said anode to narrow the discharge path adjacent said extended anode tip and thereby substantially reduce noise in the emitted laser beam.

2. A laser discharge tube according to claim 1, wherein said narrow discharge path extends at most about 10 mm in a longitudinal direction of said anode from said tip of said anode and at most about 3 mm in a direction normal to said longitudinal direction from the periphery of said anode.

3. A laser discharge tube according to claim 1, further comprising means for concentrating said discharge including an insulating layer covering said anode, except for a tip portion of said anode.

4. A laser discharge tube according to claim 3, wherein the tip portion of said anode is at most about 10 mm long.

5. A laser discharge tube according to claim 1, further comprising means for concentrating said discharge path including an insulative tube having a lower end portion, said anode being inserted in said insulative tube such that said lower end portion of said insulative tube remains unfilled with said discharge, thus defining said narrow discharge passage.

6. A laser discharge tube according to claim 1, wherein the extended tip of said anode is inserted in the opening of said capillary tube which is in a sidewall thereof.

7. A laser discharge tube according to claim 6, wherein said capillary tube has a thick wall portion and said opening is in said thick wall portion.

8. A laser discharge tube according to claim 6, wherein said opening has a diameter of $[(D+3) \times 2]$ mm, where D is the outer diameter of said anode.

9. A laser discharge tube according to claim 1 wherein said opening is at the end of said capillary tube and spaced at a distance of no more than 5 mm from the extended tip of said anode.

10. A laser discharge tube according to claim 1, further comprising magnetic means for generating a magnetic field to concentrate said discharge path onto the extended tip of said anode.

11. A laser discharge tube according to claim 10, wherein said magnetic means acts on the laser medium as it emerges from said capillary tube opening toward the extended anode tip.

12. A metal vapor positive column discharge laser tube comprising:
    an envelope including a capillary tube and a sidearm forming a part of said envelope;
    an active lasing medium contained in the envelope;
    an anode disposed in said sidearm and spaced from a cathode disposed in the envelope;
    means for causing a discharge along a discharge path in said capillary tube between said anode and cathode to thereby energize the laser medium;
    means for reducing laser noise level in the emitted laser beam including means for concentrating said discharge on the extended tip of said anode and a power source means connected to said cathode for applying a high-voltage DC voltage to thereby heat said cathode and maintain the surface temperatire of said cathode substantially constant.

13. A laser discharge tube according to claim 12, wherein said means for concentrating said discharge includes means for providing a narrow discharge passage in the vicinity of said tip of said anode, said means for providing said narrow discharge passage comprising an insulating layer covering said anode except for a tip portion of said anode.

14. A laser discharge tube according to claim 12, wherein said means for concentrating said discharge includes means for providing a narrow discharge passage in the vicinity of said tip of said anode, said means for providing said narrow discharge path comprising an insulative tube having a lower end portion, said anode being inserted in said insulative tube such that said lower end portion of said insulative tube remains unfilled with said discharge, thus defining said narrow discharge passage.

15. A laser discharge tube according to claim 12, wherein said means for concentrating said discharge comprises an opening in said capillary tube and in which a tip portion of said anode is inserted.

16. A laser discharge tube according to claim 12, wherein said power source means includes a three-phase AC power source and a full-wave rectifying circuit for rectifying an AC voltage from said three-phase power source.

17. A metal vapor positive column discharge laser tube comprising:
    an envelope including a capillary tube and a sidearm forming a part of said envelope;
    an active lasing medium contained in the envelope;
    an anode disposed in said sidearm and spaced from a cathode disposed in the envelope;
    means for causing a discharge along a discharge path in said capillary tube between said anode and cathode to thereby energize the laser medium;
    means for reducing laser noise level in the emitted laser beam including means for concentrating said discharge onto the extended tip of the anode, and a high-frequency power source means connected to said cathode for applying an AC voltage of at least 400 Hz to thereby heat said cathode and maintain the surface temperature thereof substantially constant.

18. A laser discharge tube according to claim 17, wherein said means for concentrating said discharge includes means for providing a narrow discharge passage in the vicinity of said tip of said anode, said means for providing said narrow discharge passage comprising an insulating layer covering said anode except for a tip portion of said anode.

19. A laser discharge tube according to claim 17, wherein said means for concentrating said discharge includes means for providing a narrow discharge passage in the vicinity of said tip of said anode, said means for providing said narrow discharge path comprising an insulative tube having a lower end portion, said anode being inserted in said insulative tube such that said lower end portion of said insulative tube remains unfilled with said discharge, thus defining said narrow discharge passage.

20. A laser discharge tube according to claim 17, wherein said means for concentrating said discharge comprises an opening in said capillary tube and in which a tip portion of said anode is inserted.

21. A laser discharge tube according to claim 17, wherein said power source means includes a three-phase AC power source and a full-wave rectifying circuit for rectifying an AC voltage from said three-phase power source.

* * * * *